(12) United States Patent
Lemieux

(10) Patent No.: US 11,389,713 B2
(45) Date of Patent: Jul. 19, 2022

(54) SYSTEMS AND METHODS FOR MAKING GLOVES

(71) Applicant: Epoch Lacrosse LLC, St. Paul, MN (US)

(72) Inventor: Eric Lemieux, Quebec (CA)

(73) Assignee: Epoch Lacrosse LLC, St. Paul, MN (US)

(*) Notice: Subject to any disclaimer, the term of this patent is extended or adjusted under 35 U.S.C. 154(b) by 0 days.

(21) Appl. No.: 17/321,350

(22) Filed: May 14, 2021

(65) Prior Publication Data

US 2021/0268362 A1 Sep. 2, 2021

Related U.S. Application Data

(63) Continuation of application No. 16/034,172, filed on Jul. 12, 2018, now Pat. No. 11,013,979.

(Continued)

(51) Int. Cl.
*B29D 99/00* (2010.01)
*A63B 71/14* (2006.01)
(Continued)

(52) U.S. Cl.
CPC .......... *A63B 71/141* (2013.01); *A41D 19/001* (2013.01); *A41D 19/0051* (2013.01); *A41D 19/0065* (2013.01); *B29D 99/0067* (2013.01); *A41D 13/0153* (2013.01); *A41D 13/0156* (2013.01); *A41D 13/084* (2013.01);
(Continued)

(58) Field of Classification Search
CPC .............. A41D 19/001; A41D 19/0051; A41D 19/0065; A41D 13/0153; A41D 13/0156; A41D 13/084; A41D 19/01523; A41D 13/081; B29D 99/0067; A63B 71/143; A63B 2209/00; A63B 2071/0694; A63B 2102/14; A63B 2102/22; A63B 2102/24; A63B 71/141–148

See application file for complete search history.

(56) References Cited

U.S. PATENT DOCUMENTS 5,488,739 A 2/1996 Cardinal
2012/0159681 A1 6/2012 Gibby
(Continued)

OTHER PUBLICATIONS

International Search Report and Written Option dated Oct. 3, 2018 for corresponding International Application No. PCT/US2018/042039.

*Primary Examiner* — Jun S Yoo
(74) *Attorney, Agent, or Firm* — Finnegan, Henderson, Farabow, Garret & Dunner, LLP

(57) ABSTRACT

A disclosed method for manufacturing a glove includes forming a base via molding, the base being shaped to include a palm portion and one or more extremity portions. The method also includes forming a top skin via molding, the top skin including one or more compartments, and forming a backhand assembly by attaching one or more edges of the one or more compartments of the top skin to the base. At least one remaining edge of each of the one or more compartments is unattached from the base. The method also includes reversing an orientation of the backhand assembly, filling each of the one or more compartments of the top skin with foam, and attaching the at least one remaining edge of each of the one or more compartments to the base.

20 Claims, 8 Drawing Sheets

Related U.S. Application Data

(60) Provisional application No. 62/532,187, filed on Jul. 13, 2017.

(51) Int. Cl.
| | |
|---|---|
| *A41D 19/00* | (2006.01) |
| *A41D 19/015* | (2006.01) |
| *A41D 13/08* | (2006.01) |
| *A41D 13/015* | (2006.01) |

(52) U.S. Cl.
CPC ...... *A41D 19/01523* (2013.01); *A63B 71/143* (2013.01); *A63B 2209/00* (2013.01)

(56) References Cited

U.S. PATENT DOCUMENTS

| | | | |
|---|---|---|---|
| 2015/0047088 A1* | 2/2015 | Contant | A63B 71/143 2/16 |
| 2015/0202521 A1 | 7/2015 | Abdelmalek | |
| 2017/0238632 A1* | 8/2017 | Aprile | A63B 71/143 |

* cited by examiner

SYSTEMS AND METHODS FOR MAKING GLOVES

CROSS-REFERENCE TO RELATED APPLICATION

This application is a continuation of U.S. application Ser. No. 16/034,172, filed Jul. 12, 2018, titled, "SYSTEMS AND METHODS FOR MAKING GLOVES," which is a non-provisional application of U.S. Provisional Patent Application No. 62/532,187, filed Jul. 13, 2017, titled, "Systems and Methods for making Gloves," both of which are incorporated herein by reference in their entirety.

TECHNICAL FIELD

The disclosure relates generally to manufacturing gloves and, more particularly, to methods for manufacturing gloves, including sports gloves, by molding one or more components of the gloves.

BACKGROUND

Gloves are worn by wearers under a variety circumstances and may be used for a number of different purposes. The glove manufacturing methods described herein may be applied to many different types of gloves. Manufacturing methods of the present invention are described in detail herein in embodiments relating to sports gloves. Sports gloves are used in a variety of sports to provide protection for the hands of a participant playing the sport and oftentimes holding an apparatus associated with the sport (e.g., a lacrosse stick). Such sports gloves typically include multiple regions each designed to match a particular part of the user's anatomy or provide location-specific protection for the wearer. As such, sports gloves are typically formed via labor intensive processes in which many different components are stitched, glued, or otherwise attached in intricate arrangements to reach the final assembly. Unfortunately, the large number of components results in a labor-intensive process, which leads to high monetary cost and likelihood of error in assembling the parts. Accordingly, a need exists for glove manufacturing methods that address one or more of these drawbacks.

SUMMARY

In one embodiment, a method for manufacturing a glove may include forming a base via molding. The base may be shaped to include a palm portion and one or more extremity portions. The method may also include forming a top skin including one or more compartments. The method may further include forming a backhand assembly by attaching one or more edges of the one or more compartments of the top skin to the base with at least one remaining edge of each of the one or more compartments unattached from the base. The method may also include reversing an orientation of the backhand assembly, filling each of the one or more compartments of the top skin with impact attention material, and attaching the at least one remaining edge of each of the one or more compartments to the base.

In another embodiment, a method for manufacturing a glove may include forming a base shaped to include a palm portion and one or more extremity portions. The method may also include forming a top skin via molding, the top skin including one or more compartments. The method may also include forming a backhand assembly by attaching one or more edges of the one or more compartments of the top skin to the base. At least one remaining edge of each of the one or more compartments may be unattached from the base. The method may also include reversing an orientation of the backhand assembly, filling each of the one or more compartments of the top skin with impact attention material, and attaching the at least one remaining edge of each of the one or more compartments to the base.

In another embodiment, a method for manufacturing a glove may include forming a base via molding. The base may be shaped to include a palm portion and one or more extremity portions. The method may also include forming a top skin including one or more compartments via molding. The method may also include forming a backhand assembly by attaching one or more edges of the one or more compartments of the top skin to the base. At least one remaining edge of each of the one or more compartments may be unattached from the base. The method may also include reversing an orientation of the backhand assembly, filling each of the one or more compartments of the top skin with impact attention material, and attaching the at least one remaining edge of each of the one or more compartments to the base.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

As discussed in further detail below, various embodiments of methods for manufacturing a glove are provided. In the following description, the glove manufacturing methods are described in the context of lacrosse gloves. However, presently contemplated methods are applicable to a wide range of sports gloves, including, but not limited to, lacrosse gloves, golf gloves, hockey gloves, field hockey gloves, skiing gloves, snowboarding gloves, cricket gloves, motorcross gloves, bowling gloves, batting gloves, soccer goalie gloves, and any other type of sports glove. Indeed the sports glove manufacturing methods provided herein are applicable to a wide range of sports gloves, which are often used to cover the wearer's hands while playing a sport (e.g., while holding an apparatus, such as a lacrosse stick, while playing a sport). The presently contemplated methods are also applicable to non-sports gloves, such as general use cold weather gloves, construction gloves, gardening gloves, etc.

Embodiments of the glove manufacturing methods disclosed herein may include forming one or more components of the glove via molding. For example, in some embodiments, a three dimensional (3D) molded base may be formed and/or a 3D molded top skin for forming a shell or shield may be formed. In embodiments in which a molded base is used instead of a traditional base (e.g., a flat, non-stretchy, and/or non-woven base), one or more advantages may be recognized, such as better conformity to the wearer's hand, better customizability, reduced labor and monetary costs, etc. Further, in embodiments in which a molded top skin is used instead of the traditional sewn blocs, additional advantages may be realized, such as reduced manufacturing costs, a lighter and/or more durable final product, greater customizability, a reduction in the likelihood of manufacturing error, a greater variety in size and shape of the glove, etc.

Additionally, some disclosed embodiments may include a combination of a molded base and a molded top skin. Further, in some embodiments, one or more additional components of the glove, such as the palm, wrist cuff, and/or gusset, may be formed via molding. In other embodiments, however, a base and/or top skin may be molded, and other components of the glove may be formed via traditional processes, such as by die cutting. These and other features and advantages of presently contemplated embodiments are discussed in more detail below.

Figure 1:
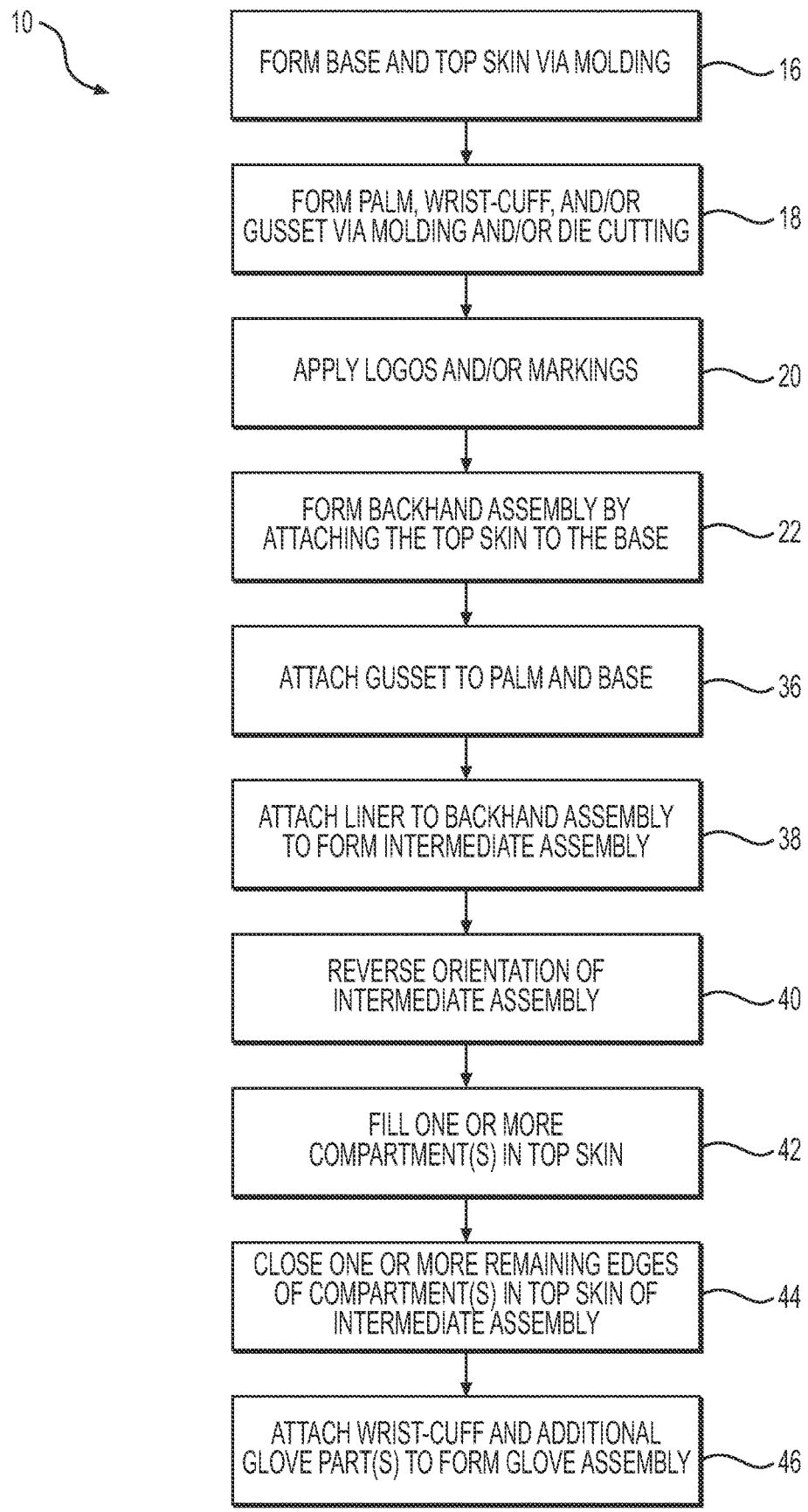
FIG. 1 is a flow chart illustrating a method for manufacturing a glove by forming a base and a top skin via molding, according to a disclosed embodiment.

Turning now to the drawings, FIG. 1 illustrates an embodiment of a method 10 for manufacturing a glove in accordance with one embodiment of the present disclosure. In the illustrated embodiment, the method 10 includes forming a molded base 12 (shown in FIG. 4) and a molded top skin 14 (shown in FIG. 4) via molding (block 16). The molding operation used to form the molded base 12 and/or the molded top skin 14 may be any suitable type of molding, including, but not limited to compression molding, injection molding, or any other type of molding known to those of ordinary skill in the art. As such, forming the molded base 12 and/or molded top skin 14 via molding may result in the molded base 12 and/or the molded top skin 14 being formed from plastic, foam, blown ethylene vinyl acetate (EVA), or any other type of molded material.

The method 10 disclosed in FIG. 1 further includes forming the palm, wrist-cuff, gusset, and/or other glove components via molding and/or die cutting (block 18). That is, depending on implementation-specific considerations, the method of forming the remaining components of the glove may differ. For example, in one embodiment, the palm, wrist-cuff, and gusset may be formed via die cutting. For further example, in another embodiment, the palm and wrist-cuff may be formed by die cutting, but the gusset may be molded. Factors such as the type of material desired for the given components, monetary constraints, time constraints, etc., may be considered when determining whether molding, die cutting, or a different method is used to form the remaining components.

The method 10 disclosed in FIG. 1 may further include applying one or more logos or markings to the molded base 12, the molded top skin 14, the palm, the wrist-cuff, the gusset, and/or any other desired components of the glove (block 20). For example, the prospective wearer may desire to apply a logo to one or more components that will be seen by the end wearer of the glove once assembly is complete. To that end, in certain embodiments, screen printing, embroidering, heat-cutting, or any other desired method may be used to apply a logo or marking to one or more components of the glove.

In some embodiments, the molded base 12 may be screen printed to mark the locations where the molded top skin 14 will be attached to the molded base 12. In yet other embodiments, the molded base 12 may be molded with indications (e.g., indentations, raised portions, etc.) showing where the top skin 14 is to attach to the molded base 12, thus reducing or eliminating the need for screen printing directional marks on the molded base 12. Still further, one or more logos may be embedded into the molded base 12 and/or molded top skin 14. For example, the logo corresponding to the glove brand may be embedded into the molded top skin 14.

Figure 4:
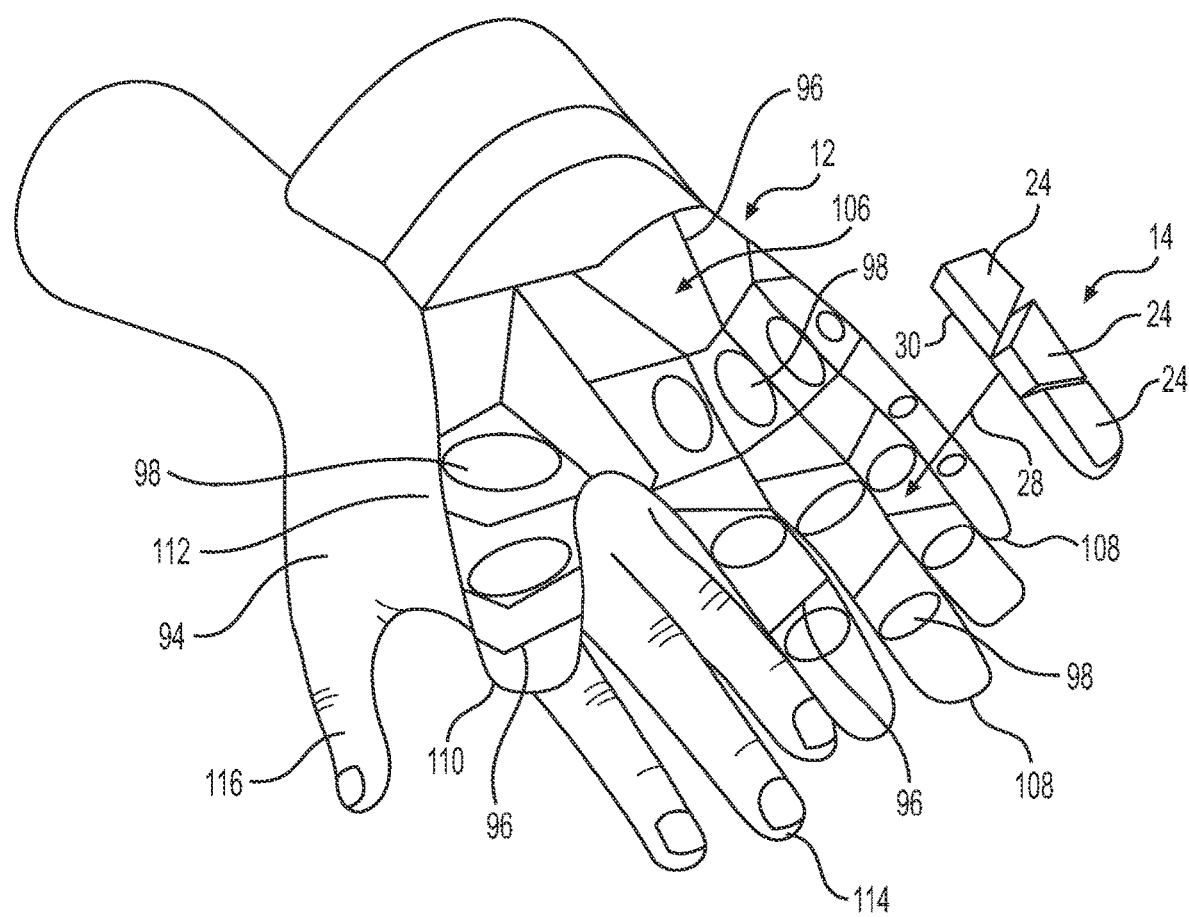
FIG. 4 is a schematic illustration of a molded base and top skin for a glove, according to a disclosed embodiment.

The method 10 may further include forming a backhand assembly by attaching the molded top skin 14 to the molded base 12 (block 22). The molded top skin 14 may be attached to the molded base 12 in any suitable manner, depending on implementation-specific variations in the size and/or shape of the molded top skin 14. For example, in one embodiment, the molded top skin 14 may include one or more compartments 24 defining one or more cavities 26. Each of the compartments 24 may be attached to the molded base 12, as shown in FIG. 4 by arrow 28, at one or more edges 30. However, in some embodiments, at least one edge 30 may remain unattached to the molded base 12 after the backhand assembly is formed at block 22. For example, in one embodiment, the compartment 24 may be formed as a square with four edges 30 adjacent the molded base 12. In such an embodiment, the backhand assembly may be formed by attaching three of the four edges 30 to the molded base 12 but leaving one edge 30 unattached from the base.

Still further, in other embodiments, the one or more compartments may be formed from other shapes and sizes such that a portion of an edge remains unattached from the molded base 12 in the backhand assembly. For example, in another embodiment, a compartment 32 may be triangular in shape such that one of the long edges 34 of the triangular compartment 32 remains unattached from the molded base 12 in the backhand assembly. Indeed, compartments 24 and 32 may be formed in any desired shape, not limited to those shown herein, such that an edge or portion of an edge remains unattached from the base in the backhand assembly.

Forming the backhand assembly with one or more open edges may offer one or more advantages. For example, the one or more secured edges may enable the relative position of the molded top skin 14 to be fixed with respect to the molded base 12. However, the one or more open edges may enable a suitable impact attention material to be introduced into the cavities 26 at a later manufacturing step. As used herein, impact attention material refers to any material configured to reduce the effects of impact. For example, the impact attention material may be foam, gel, fluid, etc. Further, it should be noted that any desired method for attaching the one or more secured edges to the molded base 12 may be implemented, including, but not limited to, sewing, stitching, gluing, and so forth.

By forming both the base 12 and the top skin 14 via molding in the embodiment of FIG. 1, one or more advantages may be recognized at block 22. For example, the molded base 12 and the molded top skin 14 may be formed in a complementary fashion, thus increasing conformity of size, shape, and/or fit between manufactured gloves. Further, the molded base 12 and molded top skin 14 may include complementary stitching grooves configured to receive stitching material (e.g., threads) and reduce or eliminate the likelihood of abrasion of the stitching material during glove use and/or the likelihood a seamstress will place the stitches in the incorrect location.

Further, in some embodiments, a molded liner may be attached to the molded base 12 and/or formed with the molded base 12. In such embodiments, the molded liner may provide additional comfort for the prospective wearer by providing a soft finish, heat management properties, etc. In some embodiments, the molded liner may be laminated to the top surface of the molded base 12, thus reducing the number of layers in the final assembly, reducing labor costs, and/or providing a liner with a lessened likelihood of dislodging during use. In some embodiments, the molded liner could also be 3D in shape to create channels for heat management.

The method 10 also includes attaching a gusset to the palm and the molded base 12 at block 36. As known by those of ordinary skill in the art, the gusset may be formed from a piece of material defining the boundaries between the extremity regions of the glove and may offer ventilation to the interior of the glove in some embodiments. In some embodiments, the gusset may be folded-stitched to the palm, and the side of the gusset assembled to the palm may then be reverse stitched to the molded base 12 of the backhand assembly. In such embodiments, the exterior of the palm and the molded top skin 14 side of the backhand assembly may be facing one another at the conclusion of block 36.

The method further includes attaching a liner to the backhand assembly to form an intermediate assembly at block 38. For example, a liner, which may be formed from fabric and/or foam, may be assembled to the underside of the molded base 12 opposite the side of the molded base 12 to which the molded top skin 14 is attached. In some embodiments, the liner may cover the extremities portions of the molded base 12 (e.g., the four fingers and thumb portions) and the backhand portion of the molded base 12 corresponding to the back of the wearer's hand. In one embodiment, the liner may be formed as a two part assembly. The two part assembly may include a first part corresponding to the one or more extremity portions of the molded base 12 and a second part corresponding to the backhand portion of the molded base 12. For further example, in one embodiment, the first part of the liner may cover the four fingers, and the second part of the liner may cover the thumb and backhand.

Once the liner is attached to the backhand assembly, the intermediate assembly is reversed in orientation at block 40. For example, the intermediate assembly may be flipped inside out in some embodiments to position the one or more cavities 26 formed by the one or more compartments 24 for further processing. In the illustrated method 10, the one or more compartments 24 are filled at block 42 with a desired material. For example, the empty cavities 26 may be filled with impact attention material (e.g., foam having one or more desired properties). In one embodiment, the impact attention material may be foam. The foam may be single density, die-cut as double density, double/triple density with offset shape, assembled with glue, or processed in any other suitable manner prior to insertion into the cavities 26. In some embodiments, the inserted material may be inserted into the cavities 26 via a machine that compresses the material and pushes it into the cavities 26 via the edge(s) remaining open from block 22.

Each of the cavities 26 may be sequentially or concurrently filled, depending on the available machinery, time constraints, etc. Further, it should be noted that each of the cavities 26 may be filled with a desired material. For instance, a first cavity may be filled with a first foam having a first density, and a second cavity may be filled with a second foam having a second density. In some embodiments, the first density and second density may be different. This may be desirable, for example, if the portions of the glove corresponding to different portions of the wearer's hand are expected to be engaged in different types of wear during use. For example, if the backhand portion is expected to experience greater wear than the thumb portion, a more durable material may be selected for the backhand portion than the thumb portion. For further example, a more flexible material may be chosen for areas of the glove proximate the wearer's knuckles to enable greater movement.

It should be noted that in certain embodiments, some or all of the filling of the compartment(s) at block 42 may be performed before block 38 and/or block 40. For example, in one embodiment, the cavities 26 may be partially or completely filled with material before attaching the liner and/or flipping the glove inside out. Indeed, depending on implementation-specific considerations, the blocks in method 10 may not be performed in the order in which they are presented herein.

The method 10 may further include closing one or more edges of the compartments 24, 32 remaining open in the molded top skin 14 of the intermediate assembly at block 44. For example, in some embodiments, the remaining open edge(s) 30 may be stitched by a seamstress. In embodiments that include a stitching groove, as discussed above, the process of closing the remaining open edges may be quicker and/or present a reduction in labor, as compared to traditional processes. Moreover, by molding the base 12 and top skin 14, the amount of extra material exposed around the remaining, last-closed edges may be reduced, as compared to traditional gloves not using molded materials.

The method 10 may also include attaching the wrist-cuff and any other desired glove components to form the final glove assembly at block 46. For example, in a lacrosse glove, the cuff-roll, wrist band, and center cuff may be reverse stitched, leaving one edge open, reversed inside out, and filled with die-cut foams, before the final open edge is closed via fold stitching. The lacrosse glove may then be finalized by assembling the final backhand assembly with the cuff-roll.

Figure 2:
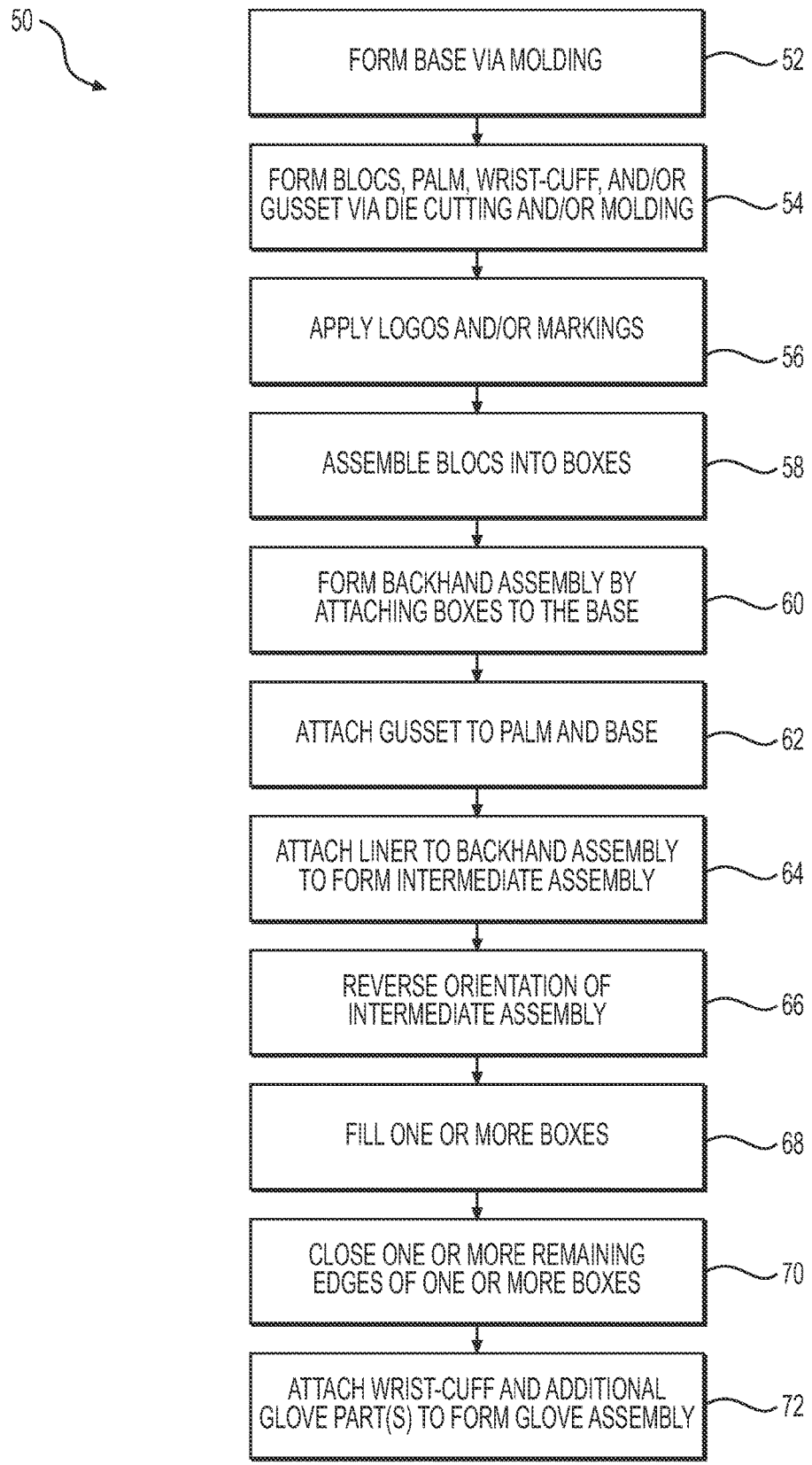
FIG. 2 is a flow chart illustrating a method for manufacturing a glove by forming a base via molding, according to a disclosed embodiment.

FIG. 2 illustrates an embodiment of a method 50 for manufacturing a glove in accordance with one embodiment of the present disclosure. The method 50 differs from the method 10 shown in FIG. 1 at least because the method 10 includes forming the base and top skin via molding (block 16), but the embodiment shown in the method 50 includes forming the base 12 via molding at block 52. The method 50 also may include forming blocs, the palm, the wrist-cuff, and/or the gusset via die cutting and/or molding at block 54. That is, in this embodiment, the base 12 may be formed via molding, as described in detail above, but the top skin 14 may be replaced by traditional die cut blocs (e.g., flat pieces of fabric).

The method 50 may include applying logos and/or markings to one or more of the glove components at block 56, in any of the manners described above for block 20. Further, the method 50 may include assembling the blocs into boxes at block 58. For example, corner edges of the blocs, formed from flat pieces of fabric, may be sewn together to form 3D boxes defining an inner cavity. Once the blocs are formed into boxes, the finished boxes may be marked for application to certain areas of the molded base 12. For example, certain boxes may be shaped for certain areas of the glove (e.g., extremities, thumb, backhand, etc.).

The method 50 may further include forming the backhand assembly by attaching the boxes to the molded base 12 at block 60. For example, the molded base 12 may include one or more indentations or raised portions used to guide the attachment of the boxes to the appropriate locations on the molded base 12. For further example, in some embodiments, reference lines, such as screen printed lines, may be provided on the molded base 12 to guide placement of the boxes. As described above, the boxes may be attached to the molded base 12 at one or more edges, but one or more edges may remain unattached to enable filling of the cavities defined by the boxes.

At block 62, the method 50 may further include attaching the gusset to the palm and the molded base 12, as described above with respect to block 36. At block 64, the method 50 may also include attaching the liner to the backhand assembly to form the intermediate assembly, as described above with respect to block 38. Similarly, as described above for block 40, the orientation of the intermediate assembly may be reversed at block 66.

The method 50 may also include filling one or more of the boxes at block 68. This operation may proceed as described above for filling the compartments in the top skin 14 at block 42. The method 50 also includes closing the one or more remaining open edges of the boxes at block 70. The open edges may be closed in any manner described above for closing the remaining open edges of the top skin 14 compartments 24. For example, the open edges may be stitched to the molded base 12 along the length of the open edge. Finally, the glove assembly may be formed at block 72 by assembling the backhand assembly with one or more additional glove components, as described above for block 46.

Figure 3:
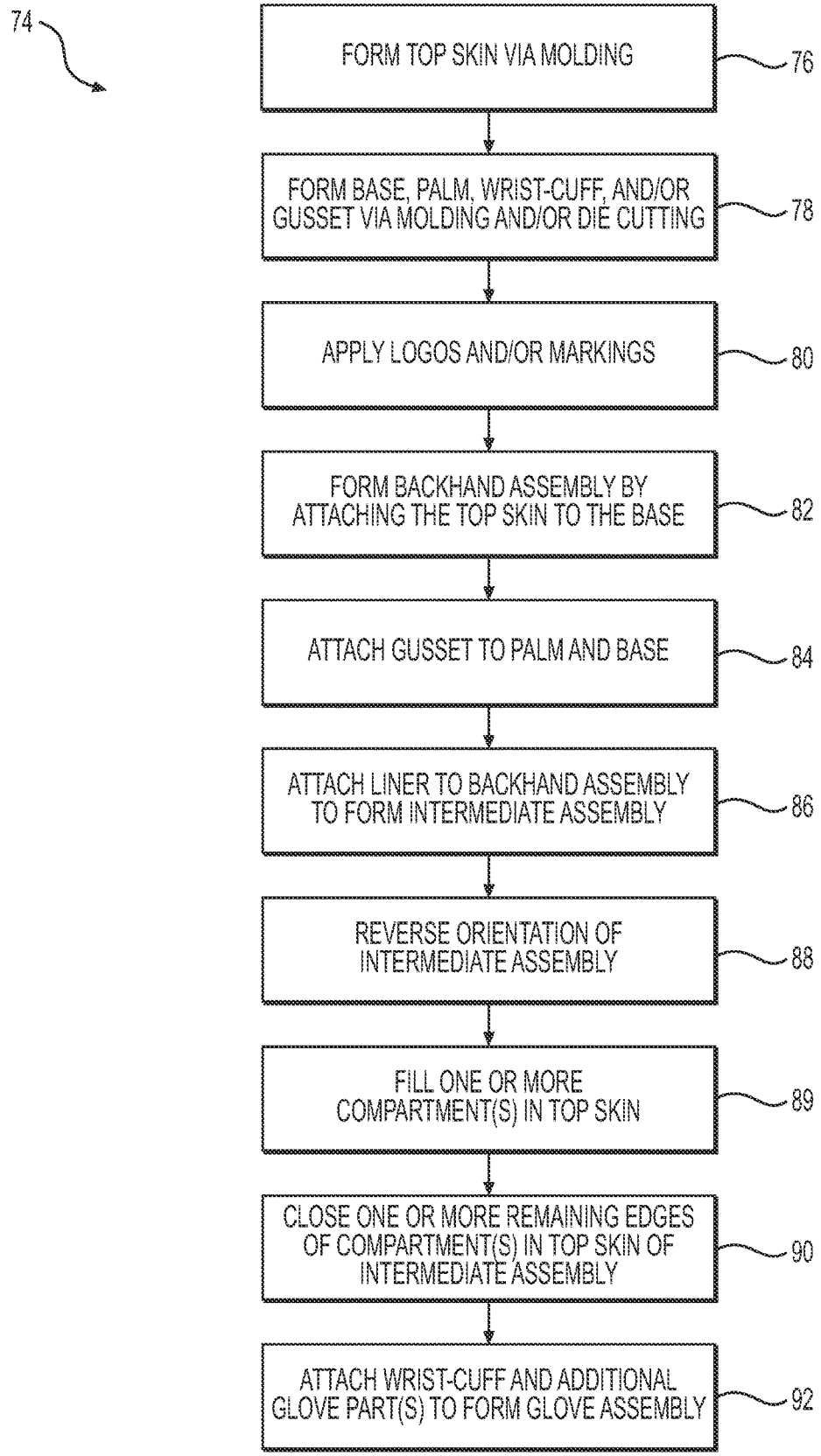
FIG. 3 is a flow chart illustrating a method for manufacturing a glove by forming a top skin via molding, according to a disclosed embodiment.

FIG. 3 illustrates an embodiment of a method 74 for manufacturing a sports glove in accordance with one embodiment of the present disclosure. The method 74 differs from the method 10 shown in FIG. 1 at least because the method 10 includes forming the base and top skin via molding (block 16), but the embodiment shown in the method 74 includes forming the top skin 14 via molding at block 76. The method 74 may also include forming the base, the palm, the wrist-cuff, and/or the gusset via die cutting and/or molding at block 78. That is, in this embodiment, the top skin 14 may be formed via molding, as described in detail above, but the base 12 may not be molded. Instead, in one embodiment, the base 12 may be formed as a flat, non-stretchy, non-woven material.

At block 80, the method 74 may further include applying one or more logos and/or markings to one or more components of the glove assembly, as described above with respect to block 20. The method 74 may also include forming the backhand assembly by attaching the molded top skin 14 to the base 12 at block 82. In this embodiment, the attachment of the molded top skin 14 proceeds as described above, except the top skin 14 is attached to the non-molded base. That is, one or more edges remain open after formation of the backhand assembly to enable insertion of a desired material.

The method 74 may also include attaching the gusset to the palm and base at block 84, attaching the liner to the backhand assembly to form the intermediate assembly at block 86, reversing the orientation of the intermediate assembly at block 88, filling the one or more compartments in the molded top skin 14 at block 89, closing one or more remaining open edges at block 90, and forming the final glove assembly at block 92. These steps proceed as described above for blocks 36, 38, 40, 42, 44, and 46 in FIG. 1.

Figure 5:
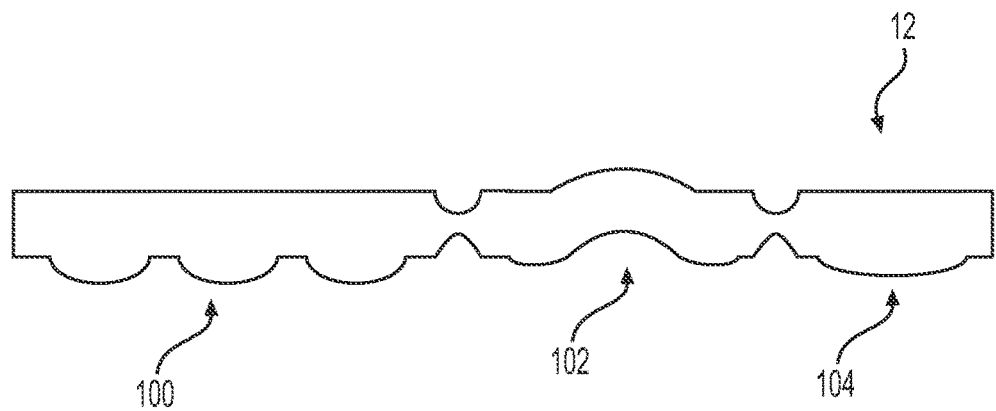
FIG. 5 is a cross sectional view of the molded base of FIG. 4, according to a disclosed embodiment.

FIG. 4 is a schematic illustration of the molded base 12 and the molded top skin 14 for a sports glove, according to one embodiment. As illustrated, the top skin 14 may be configured to match the size and/or shape of the base 12. The base 12, in turn, may be configured to match the size and/or shape of a wearer's hand 94. For example, in one embodiment, the wearer's hand 94 may be scanned or imaged to determine size, shape, and other hand features. FIG. 5 illustrates a cross sectional view of one embodiment of a base 12 including a contour region 100 corresponding to the scanned fingers, a contour region 102 corresponding to the scanned crevice region of the hand, and a scanned thumb region 104.

The image of a prospective wearer's hand 94 may then be used to form a mold from which a base 12 may be generated. The size and/or shape of the top skin 14 may then be selected to complement the size and/or shape of the base 12. In this way, the final sports glove including the molded base 12 and the molded top skin 14 may be customized for a given wearer of the glove.

In some embodiments, the molded base 12 may include one or more features that enable the glove to be manufactured in a more precise, less costly, and/or less labor intensive manor than traditional gloves. For example, the base 12 may include one or more reference markings 96. The reference markings 96 may provide reference points that indicate the correct relative positioning of the compartments 24 of the top skin 14 with respect to the base 12. As such, the reference markings 96 may be indentations, raised surfaces, printed lines, or any other permanent, semi-permanent, or temporary markings suitable for use in the given implementation.

Further, in some embodiments, the base 12 may include one or more raised surfaces 98. The raised surfaces 98 may be provided in one or more locations along the top surface of the base 12 that correspond to one or more joints of a wearer. For example, the raised surfaces 98 may be provided at the expected location(s) of a wearer's knuckles in the glove assembly.

Further, the illustrated embodiment of the base 12 includes a palm portion 106 and one or more extremity portions 108, 110. The palm portion 106 is configured to be positioned proximate a back 112 of a wearer's hand 94 in the glove assembly. The extremity portions 108 are configured to be positioned proximate a wearer's extremities 114, and the extremity portion 110 is configured to be positioned proximate the wearer's thumb 116 in the glove assembly. In that way, the illustrated molded base 12 is configured to match the shape of a prospective wearer's hand. However, in other embodiments, the molded base may be configured to match a prospective wearer's hand in another manner. For example, in implementations in which the base 12 is used to form a boxing glove, the base 12 may be formed such that extremities portions 108 are merged into a single portion.

Further, in some embodiments, a liner of the glove may be formed with or integrated in the molded base 12. For example, during molding of the molded base 12, a fabric or mesh liner may be co-formed. The liner may be provided for heat management, odor control, aesthetic appeal, and/or to increase the comfort of the wearer. Forming the liner via molding may enable different foam densities to be chosen for the liner and the molded base 12. The different foam densities may be achieved, for example, during the molding process. Further, by forming the liner via molding, and optionally during the molding of the molded base 12, a variety of different liner shapes may be achieved, including but not limited to dimples, donuts, mushroom, multiple holes, etc.

As discussed above, providing a molded base 12 may offer one or more advantages during manufacturing of the glove as compared to traditional processes. For example, the molded base 12 may be formed to more closely fit the size and/or shape of a prospective wearer's hand. For example, the molded base 12 may include one or more curved portions (i.e., a curved shape need not be created by providing breaks between flat portions) and may be a closer fit than traditional gloves, for example, by providing raised surfaces 98 to accommodate a prospective wearer's knuckles.

Further, in some embodiments, the molded base 12 may include one or more flex zones created during molding of the base 12. The one or more flex zones may be thinner areas, as compared to the remainder of the molded base 12, have holes, be open zones, etc. Still further, the reference lines 96 for stitching the boxes (or top skin(s) 14) may be incorporated in the molded base 12 to reduce labor costs and/or improve quality and precision. In certain embodiments, one or more stitching lines may be formed for the boxes/top skin(s) perimeters and/or open edge that can have a recessed channel, thus increasing precision and comfort for the wearer of the glove. In some embodiments, such as a hockey glove or lacrosse goalie glove, the molded base 12 may enable part of the hand (e.g., the thumb) to fit "inside" the top skin 14 of an incorporated reinforced part (e.g., plastic or composite), thus functioning as a thumb protector and/or thumb-lock.

Figure 6A:
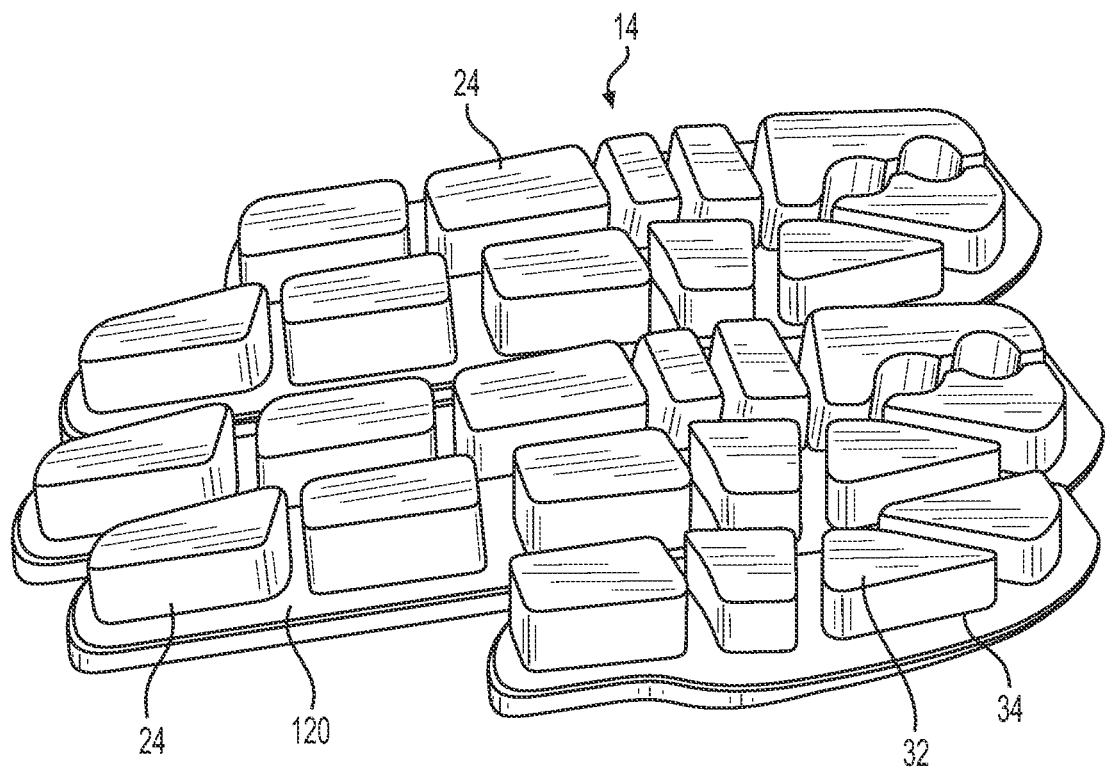
FIG. 6A is a schematic illustration of a top perspective view of a molded top skin for a glove, according to a disclosed embodiment.
Figure 6B:
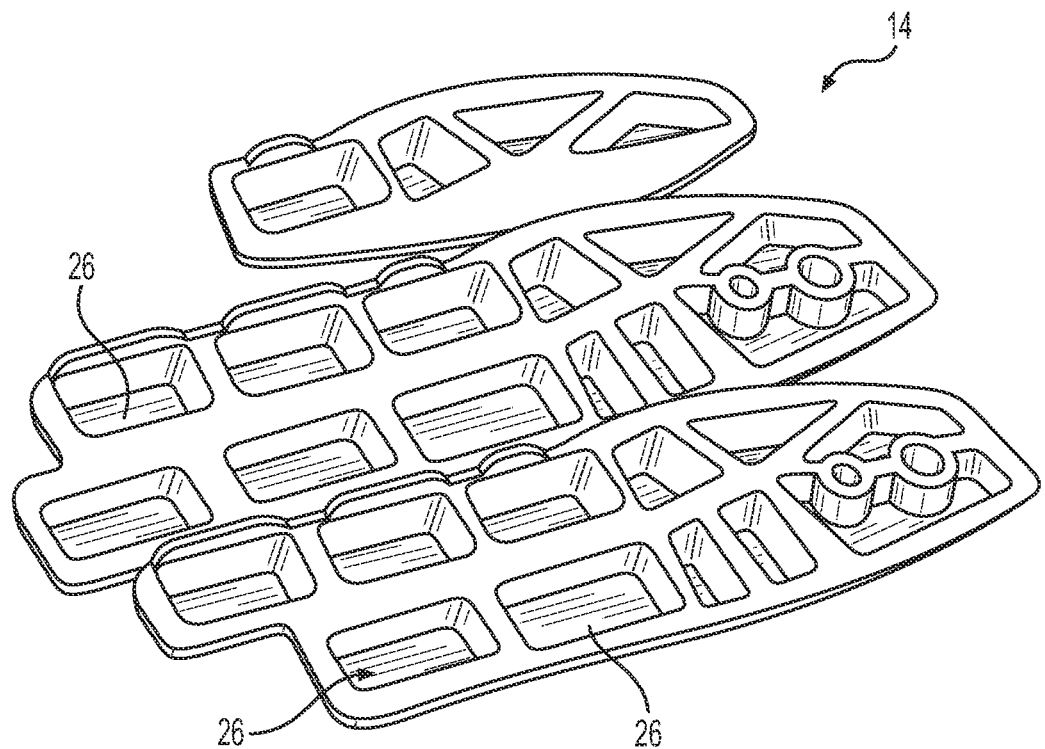
FIG. 6B is a schematic illustration of a bottom perspective view of the molded top skin of FIG. 6A, according to a disclosed embodiment.

FIGS. 6A and 6B are schematic illustrations of a top perspective view and a bottom perspective view, respectively, of the molded top skin 14 in accordance with one embodiment. As described above, the molded top skin 14 may include one or more compartments 24, 32. As shown, the compartments 24, 32 may be formed in a variety of shapes and sizes, depending on the given implementation. Each of compartments 24, 32 may define corresponding cavities 26. The cavities 26 may be filled with a desired material, such as foam, during manufacturing of the glove assembly.

In some embodiments, the compartments 24, 32 may be linked by a connecting material 120. The connecting material 120 may be configured to maintain the compartments 24, 32 in a fixed relationship with respect to one another. The connecting material 120 and the compartments 24, 32 may be concurrently formed in a given molding operation in some embodiments. However, in other embodiments, the compartments 24, 32 may be formed without connecting material 120. In such embodiments, the compartments 24, 32 may be individually attached to the base 12. Still further, in some embodiments, subsets of the compartments 24, 32 may be connected via connecting material 120, such that different regions of the glove are provided by multiple top skins 14.

As discussed above, providing a molded top skin 14 may offer one or more advantages during manufacturing of the glove as compared to traditional processes. For example, the molded top skin 14 may be used as a shell or shield that enables certain desirable manufacturing processes to be used in the presently disclosed manufacturing methods. For instance, the use of top skin 14 with compartments 24, 32 defining cavities 26 may enable reverse stitching of the palm at blocks 36, 62, and 84 and reversing the orientation of the assembly at blocks 40, 66, and 88. Further, the empty compartments 24, 32 may enable greater customizability of the glove because it enables a variety of impact attention material (e.g., foam) options to be chosen based on the prospective wearer (e.g., different protection levels).

The molded top skin 14 may further reduce or eliminate the need for use of the blocs and creation of the boxes, as compared to processes without the molded top skin 14. The foregoing feature may reduce the labor needed to manufacture a glove, reduce the likelihood of the boxes being attached to the base 12 in the improper location, and/or reduce the size and/or shape variability in the final glove assembly (e.g., by enabling greater stitching uniformity). Use of the molded top skin 14 may also enable a lighter product due to less overlay of material, as compared to using individual pieces of fabric, higher durability (e.g., by reducing the likelihood that a stitching edge may unravel), and reduction in the number of parts of the glove (e.g., to approximately 4-5 parts to match the different customizable zones of the glove). The molded top skin 14 may also enable greater complexity of shapes and sizes and a reduced likelihood of error in achieving such shapes and sizes. Further, by molding the top skin 14, any desired embossing, textures, logos, or colors could be formed as part of the molding process.

Figure 7A:
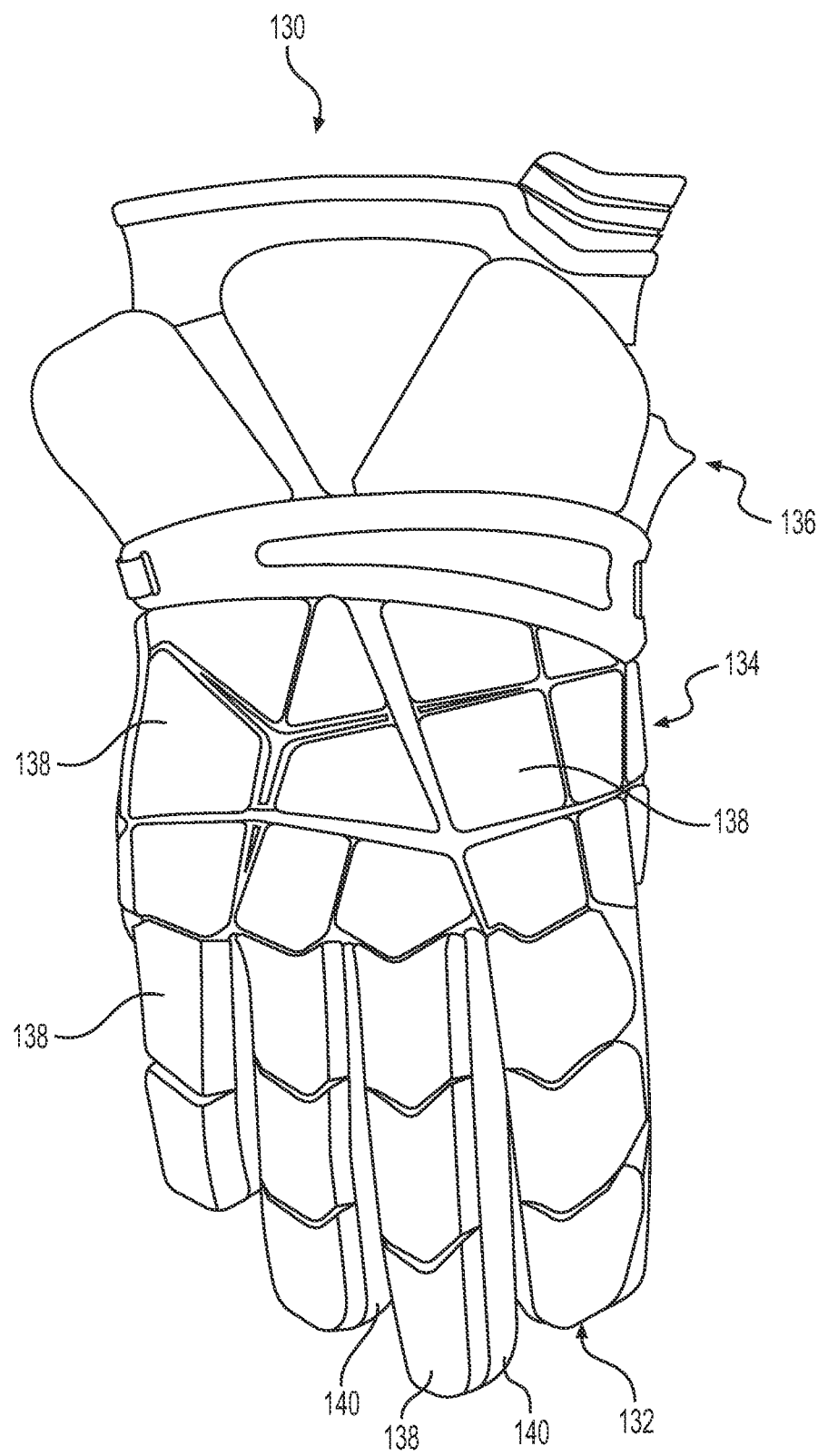
FIG. 7A is a front perspective view of an embodiment of a glove, according to a disclosed embodiment.
Figure 7B:
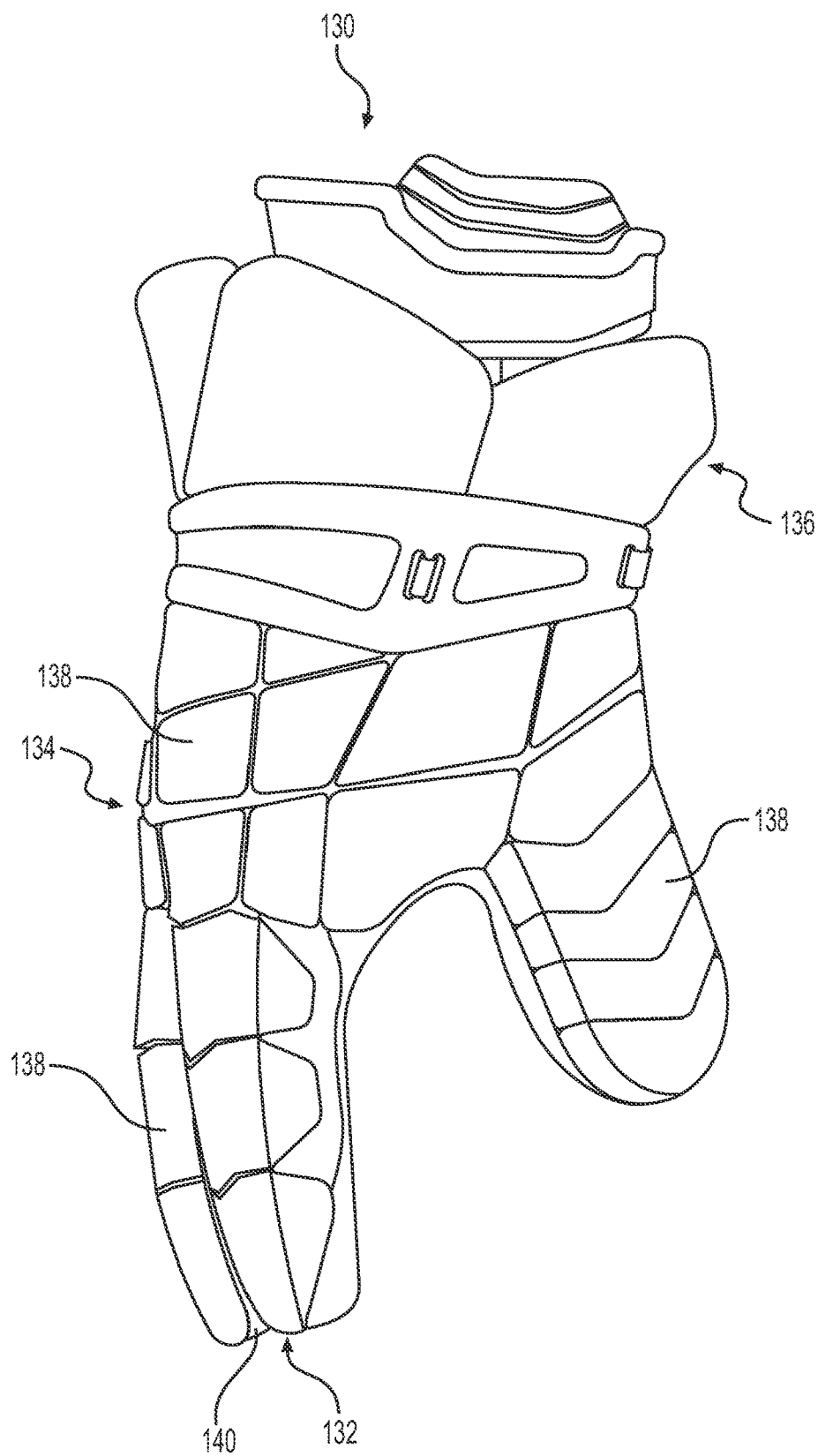
FIG. 7B is a side perspective view of an embodiment of a glove, according to a disclosed embodiment.
Figure 7C:
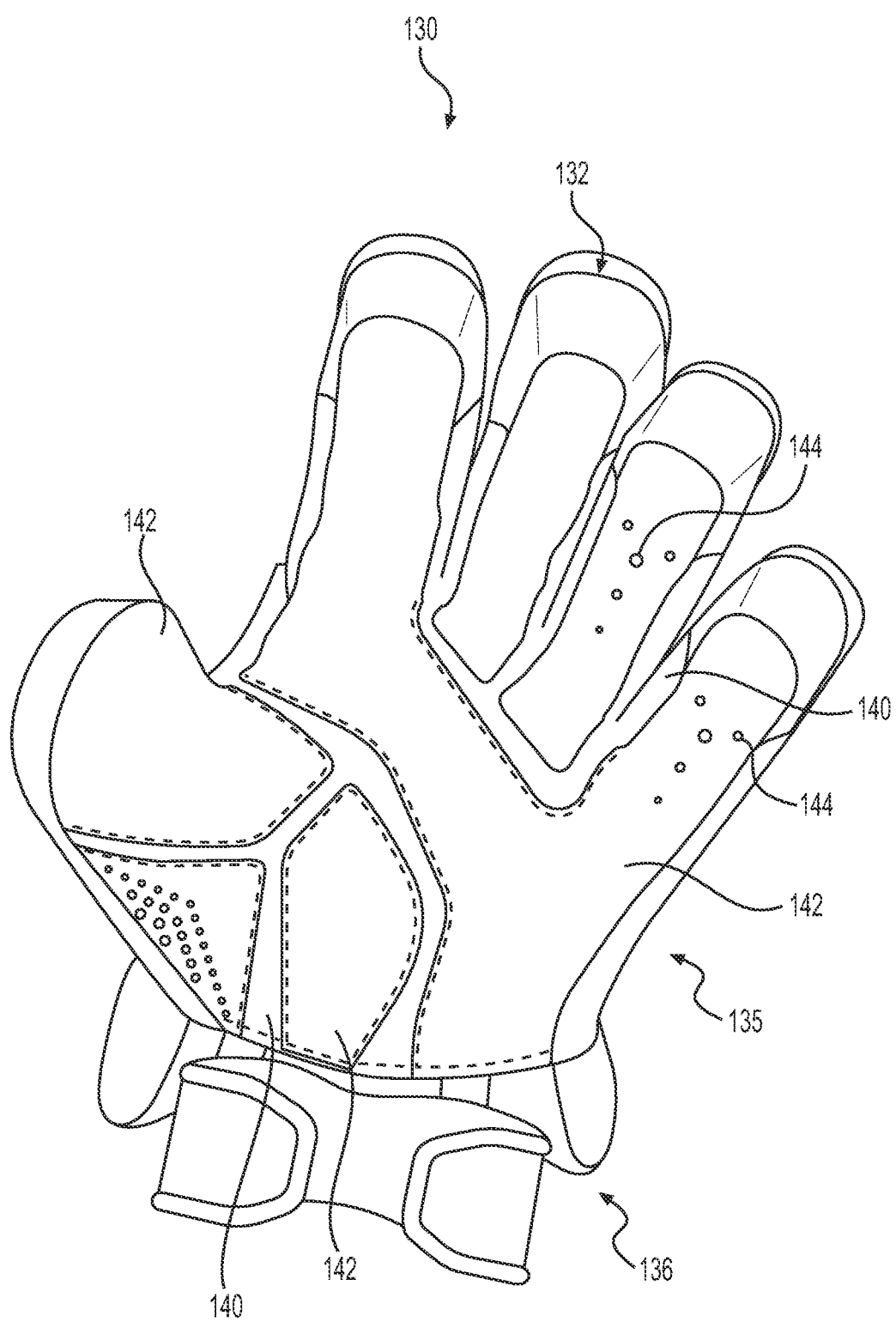
FIG. 7C is a rear perspective view of an embodiment of a glove, according to a disclosed embodiment.

FIGS. 7A-C illustrate an embodiment of a glove 130 that may be formed by one or more of the methods 10, 50, 74, according to disclosed embodiments. As shown, the glove 130 may include extremity portions 132, a backhand portion 134, a palm portion 135, and a wrist portion 136. Each of the extremity portions 132 may include one or more filled compartments 138. Likewise, the backhand portion 134 may include one or more filled compartments 138.

The glove 130 may include one or more features that enable airflow between an exterior of the glove 130 and an interior of the glove 130. For example, as shown, the extremity portions 132 may be linked by one or more gussets 140. The one or more gussets 140 may be formed from any suitable material, for example, a breathable mesh configured to allow airflow into and out of the glove 130. Moreover, the gusset 140 may be provided in one or more areas of the palm portion 135 to enable airflow to and/or from the wearer's palm. For example, in the embodiment illustrated in FIG. 7C, the gusset 140 is interspersed with liner material 142.

Further, in some embodiments, the glove may include one or more vents 144 disposed at any desired location of the glove 130. For example, as illustrated in FIG. 7C, the glove 130 may include vents 144 disposed in the extremity portions 132 of the glove adjacent the palm portion 135. However, in other embodiments, the vents 144 may be disposed in any suitable location, such as the palm portion 135.

It should be noted that the products and/or processes disclosed may be used in combination or separately. Additionally, exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the prior detailed description be considered as exemplary only, with the true scope and spirit being indicated by the following claims.

The examples presented herein are for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A method for manufacturing a glove, comprising:
forming a base via molding, the base being shaped to include a palm portion and one or more extremity portions;
forming blocs;
assembling the blocs into boxes, the boxes including one or more compartments;
forming a backhand assembly by attaching one or more edges of the one or more compartments of the boxes to the base, wherein at least one remaining edge of each of the one or more compartments is unattached from the base;
after forming a backhand assembly, reversing an orientation of the backhand assembly;
after reversing an orientation of the backhand assembly, filling each of the one or more compartments of the boxes with impact attention material; and
after filling each of the one or more compartments of the boxes, attaching the at least one remaining edge of each of the one or more compartments to the base.

2. The method of claim 1, further comprising applying one or more logos to the base.

3. The method of claim 1, further comprising forming a palm and a gusset, the gusset being assembled with the palm to form a palm assembly.

4. The method of claim 3, further comprising attaching the palm assembly to the backhand assembly by attaching the gusset to the base.

5. The method of claim 4, wherein attaching the gusset to the base comprises reverse stitching.

6. The method of claim 1, further comprising attaching a liner to the backhand assembly before reversing the orientation of the backhand assembly.

7. The method of claim 6, wherein the liner is formed from a two part assembly, the two part assembly including a first part corresponding to the one or more extremity portions and a second part corresponding to the palm portion.

8. The method of claim 1, wherein forming the blocs comprises molding the blocs.

9. The method of claim 1, wherein forming the blocs comprises die cutting the blocs.

10. The method of claim 1, wherein forming the base comprises compression molding the base.

11. A method for manufacturing a glove, comprising:
forming a base, the base being shaped to include a palm portion and one or more extremity portions;
forming blocs;
assembling the blocs into boxes, the boxes including one or more compartments;
forming a backhand assembly by attaching one or more edges of the one or more compartments of the boxes to the base, wherein at least one remaining edge of each of the one or more compartments is unattached from the base;
after forming a backhand assembly, reversing an orientation of the backhand assembly;
after reversing an orientation of the backhand assembly, filling each of the one or more compartments of the boxes with impact attention material; and
after filling each of the one or more compartments of the boxes, attaching the at least one remaining edge of each of the one or more compartments to the base.

12. The method of claim 11, further comprising applying one or more logos to the base.

13. The method of claim 11, further comprising forming a palm and a gusset, the gusset being assembled with the palm to form a palm assembly.

14. The method of claim 13, further comprising attaching the palm assembly to the backhand assembly by attaching the gusset to the base.

15. The method of claim 14, wherein attaching the gusset to the base comprises reverse stitching.

16. The method of claim 11, further comprising attaching a liner to the backhand assembly before reversing the orientation of the backhand assembly.

17. The method of claim 16, wherein the liner is formed from a two part assembly, the two part assembly including a first part corresponding to the one or more extremity portions and a second part corresponding to the palm portion.

18. The method of claim 11, wherein forming the base comprises molding the base.

19. The method of claim 11, wherein forming the base comprises die cutting the base.

20. A method for manufacturing a glove, comprising:
forming a top skin via molding, the top skin including one or more compartments;
forming a base via molding, the base being shaped to include a palm portion and one or more extremity portions;
forming a backhand assembly by attaching one or more edges of the one or more compartments of the top skin to the base, wherein at least one remaining edge of each of the one or more compartments is unattached from the base;
after forming a backhand assembly, reversing an orientation of the backhand assembly;
after reversing an orientation of the backhand assembly, filling each of the one or more compartments of the top skin with impact attention material; and
after filling each of the one or more compartments of the top skin, attaching the at least one remaining edge of each of the one or more compartments to the base.

* * * * *